Aug. 7, 1934.

G. H. POTH 1,969,093

ELECTRICAL APPARATUS

Filed Oct. 24, 1927

INVENTOR.
G. HENRY POTH
BY
Leo. H. Danker.
ATTORNEY.

Aug. 7, 1934.   G. H. POTH   1,969,093
ELECTRICAL APPARATUS
Filed Oct. 24, 1927   6 Sheets-Sheet 2

INVENTOR.
G. Henry Poth
BY
Leo D. Parker.
ATTORNEY.

Aug. 7, 1934.    G. H. POTH    1,969,093
ELECTRICAL APPARATUS
Filed Oct. 24, 1927    6 Sheets-Sheet 3

INVENTOR.
G. Henry Poth
BY
Leo A. Parker.
ATTORNEY.

Aug. 7, 1934.  G. H. POTH  1,969,093
ELECTRICAL APPARATUS
Filed Oct. 24, 1927     6 Sheets-Sheet 5

INVENTOR.
G. Henry Poth
BY
Leo H. Parker
ATTORNEY.

INVENTOR.
G. HENRY POTH
BY
ATTORNEY.

Patented Aug. 7, 1934

1,969,093

UNITED STATES PATENT OFFICE 1,969,093

ELECTRICAL APPARATUS

George Henry Poth, Cincinnati, Ohio

Application October 24, 1927, Serial No. 228,368

16 Claims. (Cl. 175—363)

The invention relates to a combination electrical and mechanical device adapted to convert a single phase alternating electric current into pulsating direct or uni-directional electric current, but which may be utilized, in a modified form, to convert a multiphase alternating current into a uni-directional current of practical constant voltage.

The objects of the invention are to provide simple, economical and durable means to convert alternating electric current into uni-directional electric current, or direct current, which may be utilized for various purposes where direct currents of electricity are required, as for instance supplying direct currents of electricity, of the same or different voltages, to apparatus presently utilizing the commonly known A, B and C electric batteries in the transmission of intelligence by means of wireless or radio appliances, recharging electric batteries, and the like; to provide a construction of said invention whereby its operation is practically positive and continuous without the necessity of frequent repairs and replacement of parts; to provide a device for the purposes intended in which slip rings, commutators, contact brushes and the like are eliminated, whereby the device is adaptable to be operated under all conditions and circumstances without producing electrical sparks, or making and breaking electrical connections; to provide said device with windings which are open at no time during its operation; to provide a device of the class described in which the use of condensers, electrolytic valves, safety resistances, and the like are unnecessary for the purpose of suppressing sparks; to provide means by which complete rectification of the full cycle, or of the complete positive and negative waves is obtained, thus effecting rectification of the current in a highly efficient manner; to provide means by which rectification of alternating current is automatically effected; to provide means adapted to convert alternating current into direct current and whereby one or a plurality of direct current circuits of the same or different voltages may be obtained.

Other objects will be apparent from the hereinafter description.

The invention consists in providing a translating device which hereinafter is termed a rectifier which operates in synchronism with the voltage of the means of supplying the alternating current, and which controls the flow of the supply current, and which controls the flow of the supply current through the rectifier.

The invention, further, consists in the combination and arrangement of the elements and the parts, and in the details of the construction, as hereinafter set forth and claimed.

In the preferred construction of the invention, shown in Figs. 1, 2, 3, and 4, I provide a three phase alternating electric current generator 1 and a three phase rectifier 2 the rotatable parts of which are mounted in spaced apart relation on the shaft 3 having its ends suitably rotatably mounted in bearings 3a in the end plates 3b of the casing 3c having the ends of the cylindrical body 3d suitably secured to the end plates. Fixed to the outer protruding end 3e of the shaft is the pulley 3f having suitable operative connection with suitable outside source of power.

Figure 1:
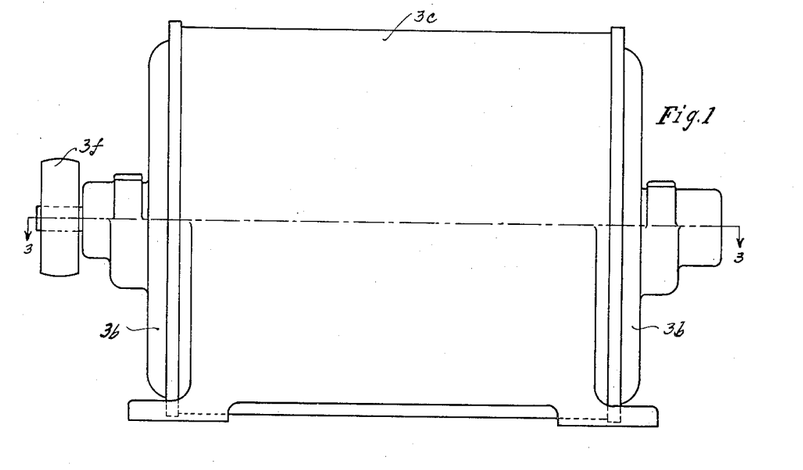
Fig. 1 is a side elevation of the invention.
Figure 2:
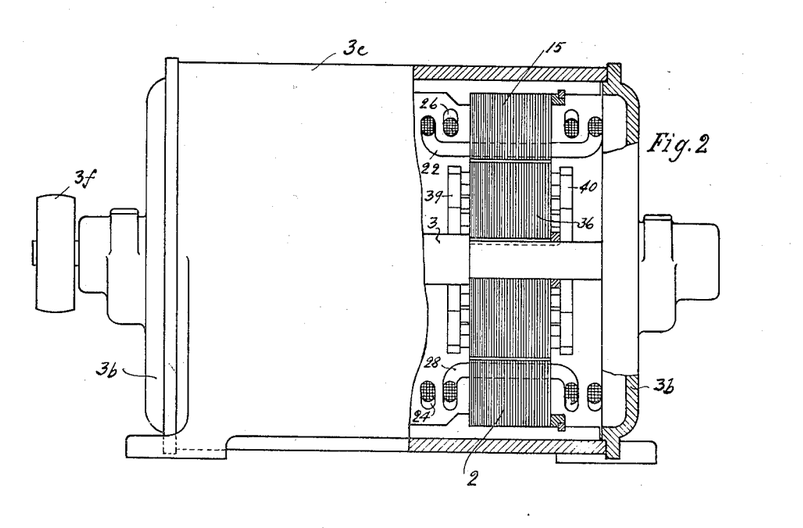
Fig. 2 is a section taken on a line corresponding to 2—2 in Fig. 4; showing parts in side elevation.
Figure 3:
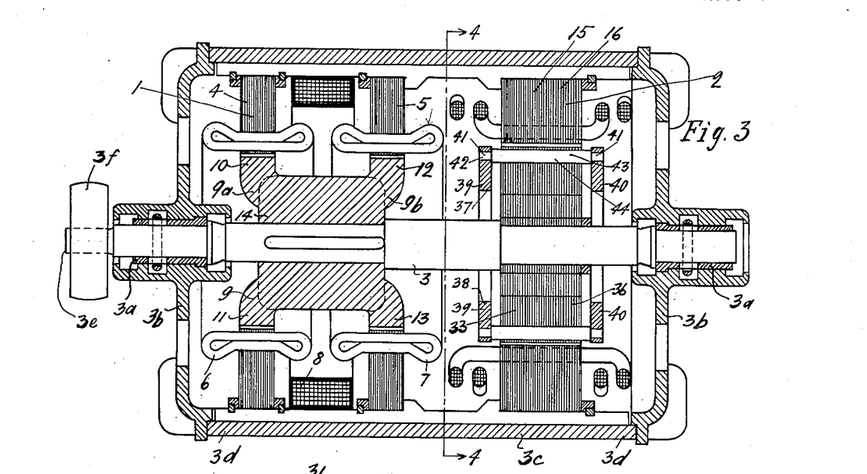
Fig. 3 is a section taken on a line corresponding to 3—3 in Fig. 1.
Figure 4:
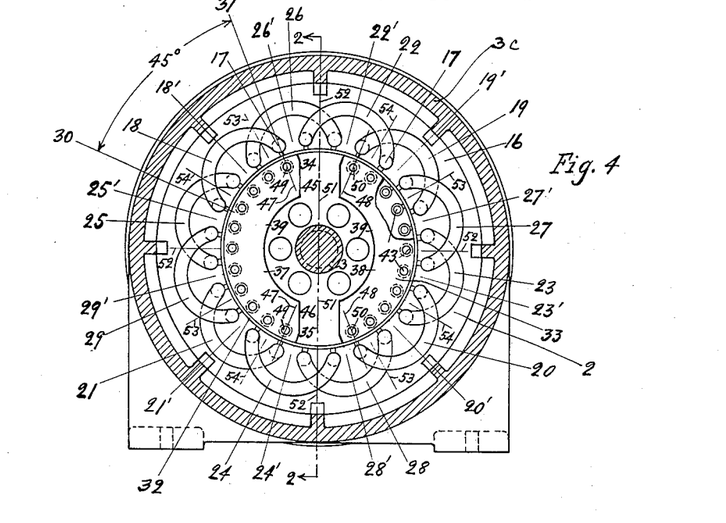
Fig. 4 is a transverse section taken on a line corresponding to 4—4 in Fig. 3.

The generator 1 is a two pole homopolar type consisting of two stators 4 and 5 which preferably both carry windings 6 and 7 for the generation of the three phase alternating current. Corresponding phases of both stators may be connected in series or in parallel or in any other suitable manner as desired.

Between the stators 4 and 5, and stationarily secured to the housing 3c, is arranged the direct current field coil 8 which energizes the magnet system 9 having two pole systems 9a and 9b. The 9a system has the poles 10 and 11 of the same polarity for stator 4. The 9b system has the poles 12 and 13 of the opposite polarity for stator 5. The magnet system 9 whose hub 14 is mounted on shaft 3, is securely fastened to the latter.

The alternating current stator windings and the direct current field coil are stationarily arranged whereby the generator 1 requires no slip rings and brushes. Therefore, a mechanical arrangement of the highest efficiency and safest type, electrically and mechanically, is provided.

The shaft 3 may be operated at a speed of 1800 R. P. M., and thus the generator 1 (being of the equal pole type) will deliver a three phase current of a frequency of 3600 cycles per minute. In other words, one full revolution of the shaft 3 corresponds to the duration of two complete cycles. It is understood, of course, that instead of the type generator shown in the drawings, any generator or combination of generators of any suitable type capable of producing a duo-directional E. M. F. of any character, may be used.

The stator 15 of the rectifier 2, suitably fastened to the housing 3c, is constructed substantially the same as a usual stator of an induction motor and consists of the usual laminated iron ring or core 16 having spaced apart slots 17 in axial alignment therethrough, which receive the stator windings. Since the rectifier 2, shown in Figs. 1, 2, 3 and 4, is a three phase rectifier, three sets (each set consisting of four coils, or four coils for each phase) are provided comprising twelve coils which are disposed symmetrically at 30 degrees circumferentially. The coils of each phase are disposed at 90 degrees circumferentially, and are inductively wound, as will be explained hereinafter.

Thus the coils 18, 19, 20, 21, whose center lines 18', 19', 20', and 21', respectively, are disposed at 90 degrees, represent phase A; the coils 22, 23, 24, and 25, having their center lines 22', 23', 24', and 25', respectively, disposed at 90 degrees, represent phase B, and the coils 26, 27, 28, and 29 having their respective center lines 26', 27', 28', and 29' disposed at 90 degrees, represent phase C. All of the coils are insulated from the iron 16. Each of the coils is 45 degrees in width, as measured from the center lines 30 and 31 of the slots 17. The rotor 33 is mounted in the cylindrical bore 32 in the stator and spaced therefrom.

The rotor 33 of the rectifier 2 is constructed substantially the same as a squirrel cage rotor of an induction motor, except that the open sections 34 and 35, disposed diametrically opposite from each other, contain no electrical conductors in the laminated iron 36. In other words, the rotor 33 comprises two cages 37 and 38, each consisting of the end plates 39 and 40 having holes 41 therein. The holes 41 receive the ends 42 of the spaced apart conductor bars 43 which pass through the spaced apart holes 44 in the laminated iron 36. The cages 37 and 38 are separated from each other, as are also the adjacent end plates 39 and the adjacent end plates 40, whereby the open spaces 45 and 46 are formed between the end plates, respectively.

An important feature of the arrangement of the cages 37 and 38 is that the center lines 47 and 48 of the end bars 49 and 50, of the bars 43, are spaced substantially the same number of degrees, circumferentially of the rotor 33, as the spacing of the center lines 30 and 31 between the slots 17 in the stator 15.

The bars 43, of the respective cages 37 and 38, are electrically connected or short circuited through the respective end plates 39 and 40. The bars 43 and end plates 39 and 40 preferably are insulated from the iron 36 of the rotor 33. Each squirrel cage 37 and 38 is a short circuited winding.

The rotor 33 is suitably secured to the shaft 3 to which, as previously explained, is fastened the magnet system 9 of the generator 1. Both the generator and the rectifier are thus mechanically coupled together in direct drive and operated in synchronism.

Figure 8:
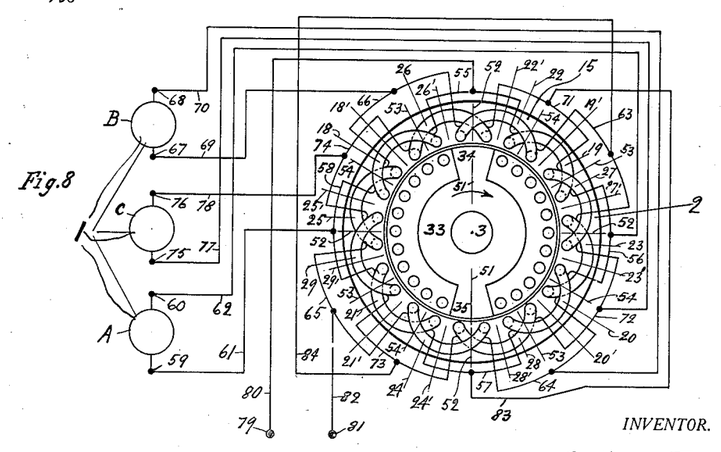
Fig. 8 is a diagrammatical view of the rectifier using a three phase alternating current supply current.

As shown in Fig. 8, the voltage of phase A is zero when the center lines 51, of the open spaces 34 and 35, register with the lines 52 positioned intermediate and equi-distant spaced apart from the center lines 18', 19', 20', and 21' of the coils 18, 19, 20 and 21, respectively; the voltage of phase B is zero when the center lines 51, of the spaces 34 and 35, register with the lines 53 positioned intermediate and equi-distant spaced apart from the center lines 22', 23', 24', and 25', of the coils 22, 23, 24, and 25, respectively; and the voltage of the phase C is zero when the center lines 51, of the open spaces 34 and 35, register with the lines 54 positioned intermediate and equi-distant from the center lines 26', 27', 28', and 29' of the coils, 26, 27, 28, and 29, respectively. Therefore, one quarter of the circumference of the stator 15 corresponds to one voltage wave, and the whole circumference of the stator corresponds to two complete cycles, which correspond to the frequency of the generator 1.

As shown in Fig. 8 the coils 18 and 19 are connected with the conductor 55; the coils 19 and 20 are connected with the conductor 56; the coils 20 and 21 are connected with the conductor 57; and the coils 21 and 18 are connected with the conductor 58. The four coils 18, 19, 20, and 21, therefore, form one continuous winding. The conductors 58 and 56, respectively, are connected with the terminals 59 and 60 of phase A, of the generator 1, as by the conductors 61 and 62, respectively.

The coils 22 and 23, of phase B of the rectifier 2, are connected with the conductor 63; coils 23 and 24 are connected with the conductor 64, coils 24 and 25 are connected with the conductor 65; and the coils 25 and 22 are connected with the conductor 66. The conductors 66 and 64 are connected with the terminals 67 and 68 of phase B of the generator 1, as by the conductors 69 and 70, respectively.

The coils 26 and 27, of phase C of the rectifier, are connected with the conductor 71; the coils 27 and 28 are connected with the conductor 72; the coils 28 and 29 are connected with the conductor 73; and the coils 29 and 26 are connected with the conductor 74. The conductors 72 and 74 are connected with the terminals 75 and 76, of phase C of the generator 1, as by the conductors 77 and 78, respectively. The conductor 55, of phase A, is connected with the direct current terminal 79 as by the conductor 80, and the conductor 65, of phase B, is connected with the direct current terminal 81 as by the conductor 82. Also, the conductor 83 connects conductors 57 and 71 of phases A and C, respectively, and the conductor 84 connects the conductors 73 and 63 of phases C and B, respectively.

Figure 5:
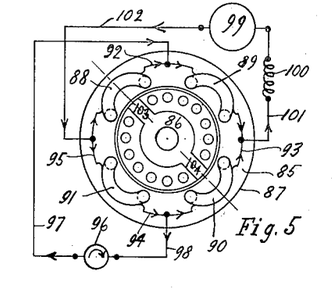
Fig. 5 is a diagrammatical view of the invention.
Figure 6:
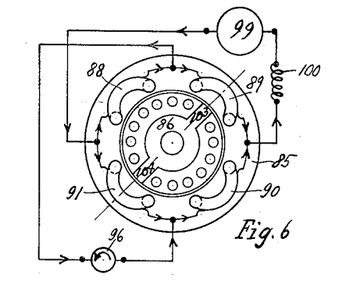
Fig. 6 is a diagrammatical view of the invention showing the rotor of the rectifier in a modified position.

For the purpose of explaining the fundamental principle and operation of the invention, previous to explaining the operation of the three phase rectifier, reference is made to Figs. 5 and 6 in which is shown a single phase rectifier 85, consisting of the rotor 86 and the stator 87 which are similar in construction to those shown in Figs. 2, 3, 4, and 8 except that the stator 87 is provided with only one set of coils 88, 89, 90, and 91, corresponding to a single phase current. The four coils 88, 89, 90, and 91, of the stator 87, are positioned at points separated by 90 degrees circumferentially of the stator. The width of each coil is 45 degrees circumferentially of the stator similar to the arrangement of the coils 18, 19, 20, and 21 of phase A in Fig. 8. The coils 88 and 89 are connected with the conductor 92; the coils 89 and 90 are connected with the conductor 93, the coils 90 and 91 are connected with the conductor 94; and the coils 91 and 88 are connected with the conductor 95.

Connected with the conductors 92 and 94, as by the conductors 97 and 98, is the armature 96 of an ordinary single phase commutator motor. To the conductors 93 and 95 is connected a single phase alternating current generator 99 having the field winding 100 of the motor connected in series with the generator 99 as by the conductor 101 and 102, respectively. The direct current field winding of the generator is omitted, as in all subsequent figures.

As can be seen the various elements are connected in Wheatstone bridge form. If the rotor 86 is placed in the position shown in Fig. 5, its open spaces 103 and 104 are in alignment with the coils 88 and 90, and consequently voltage will be impressed upon the coils 88 and 90, for the reason that the reluctance of the magnetic path of the coils 88 and 90 is very low, because the open spaces 103 and 104 form a natural path for the magnetic flux set up by the coils 88 and 90, which are therefore highly reactive and thus produce a high E. M. F. of self induction, whereas substantially no voltage will be impressed upon the coils 89 and 91, because of the effect of the squirrel cages which form a short-circuited winding with its plane at right angles to the axis of the coils 89 and 91 whereby the tendency of the coils 89 and 91 to set up a flux is suppressed. In other words, the reluctance of the magnetic path of coils 89 and 91 is very high and thus the inductance of the coils 89 and 91 is reduced practically to zero and therefore the impedance of the coils 89 and 91 is at a minimum value. The coils 89 and 91 thus represent practically ohmic resistance only, which in the invention may be made as small as desired with the result that almost the whole voltage of the generator is impressed on the armature of the commutator motor. This action of the squirrel cages is due to the counteracting effect of the currents in the squirrel cage bars which currents are set up in these bars by transformer action as well as by generator action when the bars traverse the path of the fields of coils 89 and 91.

In Fig. 5 is shown by the arrows the direction of the flow of the electric current in the various parts for an assumed polarity of the generator at a given instant. It is apparent that the coils 88 and 90 and the armature 96, with reference to their connections with the generator 99, can be considered as being connected in parallel to the generator 99, whereby the dead coils 89 and 91 carry both the magnetizing current of coils 88 and 90 respectively, as well as the current flowing through armature 96. It is assumed that the direction of the flow of the current, as indicated by the arrows in the field 100 and the armature 96 effects rotation of the armature 96 in a clockwise direction.

Now referring to Fig. 6, in which the rotor 86 is positioned with its open spaces 103 and 104 in alignment with the coils 89 and 91, it is apparent that the reverse of the action just previously explained with reference to the device shown in Fig. 5 takes place, because now the voltage will be impressed upon the coils 89 and 91 while the coils 88 and 90 are dead, or not excited, for the reasons previously explained. Assuming for a given instant, that the polarity of the generators 99 is the same as that indicated in Fig. 5, the direction of the flow of the electric currents in the various parts will be as indicated in Fig. 6. It will be seen that now the dead coils 88 and 90 carry both the magnetizing current of coils 89 and 91, respectively, as well as the current through armature 96, which, however, flows through the armature in the opposite direction as indicated by the arrows. Therefore, the armature will rotate now in anticlockwise direction. In other words, the device shown in Figs. 5 and 6, may be used as a reverser.

It will be evident, of course, that the coils 88 and 90, for instance, which set up the magnetic flux in the rectifier 85, as in Fig. 5, must be wound in such a manner as to produce opposite magnetic polarities in order to drive the flux through the rotor iron. If the coils 88 and 90 produce the same polarity the coils would oppose each other and their magnetizing currents would attain an excessive high value which would be detrimental for both rectifier and generator windings. The same is true with reference to the coils 89 and 91.

In Figs. 5 and 6 it is assumed that the rotor 86 of the rectifier 85 is stationary in the two positions shown. The function of the rotor is to change the polarity of the output current with reference to the input current. In other words, where the generator 99 supplies a single phase alternating current, the output is also a single phase alternating current, and the difference in the currents is the polarity of the input and output currents, for different positions of the rotor 86. As previously explained, the function of the rotor can be, for instance, utilized in constructing a device to reverse the direction of rotation of a motor.

Figure 7:
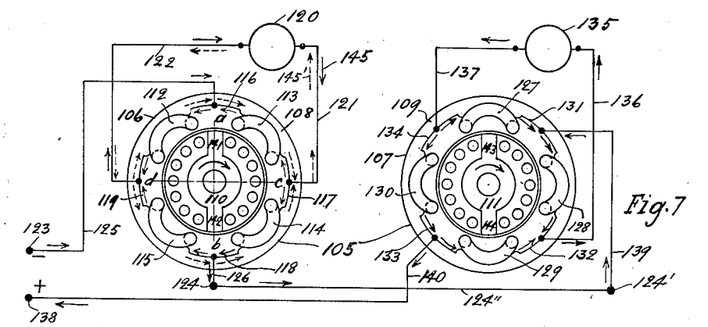
Fig. 7 is a diagrammatical view of the rectifier using a two phase alternating current supply current.

In Fig. 7 is shown a two phase rectifier 105 consisting of two single phase rectifiers 106 and 107 comprising the stators 108 and 109, respectively, and the rotors 110 and 111, respectively, which are constructed in exactly the same manner as the rectifier 85 shown in Figs. 5 and 6. The stator 108 of the rectifier 106 carries four coils 112, 113, 114, and 115 which are displaced at 90 degrees circumferentially of the stator. The angular width of each coil is 45 degrees circumferentially of the stator. The coils 112 and 113 are connected with the conductor 116; the coils 113 and 114 are connected with the conductor 117; the coils 114 and 115 are connected with the conductor 118; and the coils 115 and 112 are connected with the conductor 119. To the conductors 117 and 119 is connected the single phase generator 120, as by the conductors 121 and 122. The conductors 116 and 118 are connected with the terminal points 123 and 124, respectively, as by the conductors 125 and 126.

The stator 109 of the rectifier 107 carries four coils 127, 128, 129, and 130 which are displaced at 90 degrees circumferentially of the stator. The angular width of each coil is 45 degrees circumferentially of the stator. The coils 127 and 128 are connected with the conductor 131; the coils 128 and 129 are connected with the conductor 132; the coils 129 and 130 are connected with the conductor 133; the coils 130 and 127 are connected with the conductor 134. To the conductors 132 and 134 is connected the single phase generator 135, as by the conductors 136 and 137, respectively. The conductors 131 and 133 are connected with the terminal points 124' and 138, respectively, as by the conductors 139 and 140, respectively. Also, the terminal 124 is connected with the terminal 124'; as by the conductor 124''.

The rotors 110 and 111 are of similar construction as the rotors shown in Figs. 4, 5, 6, and 8, and have open sections 141, 142, 143, and 144. The width of the openings between the end bars of the cages is 45 degrees. Both of the rotors 110 and 111 as well as the rotating part of the generators 120 and 135 are securely fastened to the same shaft similar to the arrangement shown in Fig. 3, and thus may be driven in synchronism. However, the rotors are mounted so that when, for instance, the sections 141 and 142 of the rotor 110 are in alignment with the spaces between the stator coils of the stator 108, the sections 143 and 144 of the rotor 111 are in alignment with the stator coils of the stator 109, as shown.

The direction of rotation of the rotors 110 and 111 may be clockwise. The operation of the rotors is in synchronism with the voltage of the generators. The voltage of both generators is zero when the center lines of the open sections of the rotors of their respective rectifiers to which they are connected register with lines which lie symmetrically between the stator coils, and the voltage of the generators is maximum when the open sections of the respective rotors register with the center lines of the stator coils. Therefore, the voltage of generator 120, shown in Fig. 7, is zero at the instant when the voltage of the generator 135 is at maximum with either positive or negative polarity.

The operation of the rectifiers 106 and 107 shown in Fig. 7 are similar. Therefore, only the function of the rectifier 106 will be explained. Assume that the voltage of the generator 120 is positive, (as indicated by the arrows 145 in full lines) during the first quarter revolution of the rotor 110 from the position $ab$ to the position $cd$, then negative (as indicated by the arrows 145' in dotted lines) during the second quarter revolution from $cd$ to $ba$, then positive during the third quarter of the revolution from $ba$ to $dc$, and negative during the fourth quarter of the revolution of the rotor from $dc$ to $ab$. Therefore, during the first quarter of the revolution of the rotor the positive voltage wave is impressed upon the coils 113 and 115, at the period when the coils 112 and 114 are magnetically dead (as explained with reference to the form of the invention shown in Figs. 5 and 6). The positive voltage wave of the generator 120 is thus impressed upon the terminal points 124 and 123 whereby the terminal 124 is positive and terminal 123 is negative. During the succeeding quarter revolution of the rotor the coils 113 and 115 are dead and the negative voltage wave (indicated by the dotted arrows 145') is impressed upon the coils 112 and 114 and also upon the terminals 124 and 123 whereby, since the coils 113 and 115 are dead, the terminal 124 is again positive and the terminal 123 is negative. During the third succeeding quarter revolution of the rotor the previously described cycle begins anew.

In other words, when referring to the rectifier 106 in Fig. 7, the current from the generator 120 is re-directed substantially every second one-half cycle so that the normal direction of the flow of the current, during these latter mentioned periods is reversed, whereas the current flows the same direction through the output, between terminals 123 and 124, every one-half cycle, whereby substantially a unidirectional current or a pulsating direct current is obtained from the rectifier.

Figure 9:
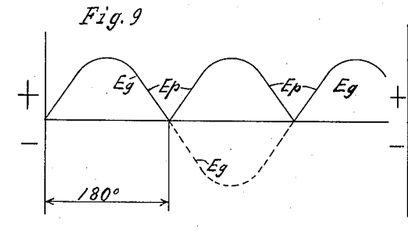
Fig. 9 is a diagram showing the form of the voltage curve as obtained from the arrangement shown in Fig. 7, when only one each of the rectifiers and generators are used.

The important function of a single phase rectifier with a rotating rotor is, therefore, to continuously reverse the polarity of substantially every second voltage wave of the input current. The result of this operation is clearly shown in Fig. 9, in which $Eg$ represents the single phase voltage curve of the supply line, and $Ep$ represents the rectified pulsating direct current voltage curve. $Ep$ always has the same polarity, but varies between zero and maximum.

Figure 10:
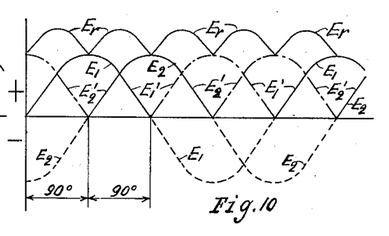
Fig. 10 is a diagram showing the form of the voltage curve obtained from the two phase rectifier shown in Fig. 7.

Obviously the rectifier 107 wrich rectifies the second phase of the current supplied by the generator 135, furnishes a pulsating direct current of the same characteristic as that obtained by the rectifier 106, but its maximum voltage will occur at the time when the voltage of the rectified current of the rectifier 106 is zero, or vice versa. It is apparent that if the output terminals of both rectifiers, that is both pulsating direct current voltages are connected in series so that the voltages add together, as shown in Fig. 7, the resultant voltage impressed upon the terminals 123 and 138 will have less variation of amplitude than the voltage obtained from one single phase rectifier. In other words, a more constant voltage is obtained by use of a two phase rectifier, as clearly illustrated in Fig. 10 in which $E1$ and $E2$ represent the voltage curves of both phases of the current, $E1'$ and $E2'$ the respective pulsating direct current voltages, and $Er$ the resultant of both pulsating direct current voltages when they are connected in series to acquire a cumulative result.

Also, it is apparent that the polarity of the current of the generator 135 and rectifier 107 for the first one-eighth revolution of the rotor will be as shown in Fig. 7, since the terminal 138 is positive polarity of the direct current.

In connecting the stator coils of the rectifiers 106 and 107, the same rules, as previously mentioned with reference to the stator coils of rectifier 85 in Fig. 5 and Fig. 6, must be observed. The only difference between the two arrangements is that in the form of the invention shown in Fig. 5 and Fig. 6 the magnetic flux in the stator coils is built up and disappears successively as long as the rotor remains in the one or the other of the shown positions, while in the arrangement of Fig. 7, where the rotor rotates continuously, the flux in the stator coils is built up and caused to disappear during every second voltage wave, and during intermediate time intervals the flux remains zero or practically so. In other words, the respective coils are alternately energized and dead, as will be understood from the previous explanation.

Since the rotors of both rectifiers 106 and 107 may be constructed similarly both rectifiers can be combined into one unit having one rotor and one stator. The latter carrying the coils 112, 113, 114 and 115 for the first phase and the coils 127, 128, 129, and 130 for the second phase, which is displaced at 90 degrees. Both sets of the coils would be arranged so that the center lines of the coils of one phase would come symmetrically between the center lines of the coils of the other phase to conform with the requirements involved by the use of the two phase current, as explained with reference to the individual rectifiers in Fig. 7. The stator and rotor iron will then carry the flux of both phases.

In connecting the stator coils of the two phase one unit rectifier the same rules again apply to each phase in a similar manner as was previously explained with reference to the separate stators shown in Fig. 7, and the distribution of the resultant magnetic flux through the rotor iron depends upon the magnetic polarity of the coils of both phases energized at the same time. The design of the one unit machine is much more compact and therefore less in weight.

After the above explanation the operation of the three phase rectifier, described with reference to Figs. 1, 2, 3, 4, and 8, is more readily understood and it is apparent that it may be manufactured as a single or one unit machine having a one unit rectifier, as shown. Each individual rectifier winding of the three phase rectifier functions as a single phase rectifier in the same manner as the windings of the two phase unit, whereby the output sides of the three rectifiers are connected in series so that the three rectified pulsating direct current voltages are cumulative.

Figure 11:
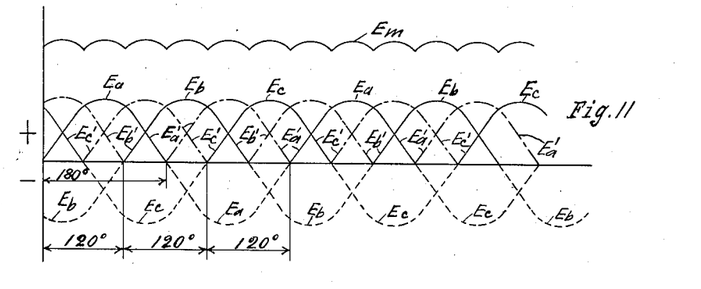
Fig. 11 is a diagram showing the form of the voltage curve obtained from the three phase rectifier shown in Fig. 8.

Comparing the form of the invention shown in Fig. 8 with the diagram shown in Fig. 11 in which Ea, Eb, and Ec represent the voltage curves of phases A, B, and C, respectively, of the alternating current side of the rectifier, the three phases being displaced 120 electrical degrees as indicated. It is apparent that 180 electrical degrees as indicated in Fig. 11 correspond to 90 geometrical degrees of the device shown in Fig. 8, and 120 electrical degrees of Fig. 11 corresponds to 60 geometrical degrees of the device shown in Fig. 8. Therefore, when the rotor 33 rotates in clockwise direction the coils 18, 19, 20, and 21 represent phase A, the coils 22, 23, 24 and 25, which are displaced 60 degrees from phase A, represent phase B, and the coils 26, 27, 28, and 29, which are displaced 60 degrees from phase B, represent phase C.

The method of connecting the stator coils, and their polarity of the two phase one unit rectifier, is also applicable with reference to the three phase one unit rectifier, and all multiphase one unit rectifiers.

In Fig. 11, Ea', Eb', and Ec' represent the rectified voltages, or the pulsating direct current voltages of phase A, B, and C, respectively. The resultant direct current voltage is represented by Em, obtained by adding the ordinates of Ea', Eb', and Ec'. It will be seen that the three phase rectifier furnishes a more constant direct current voltage than a two phase rectifier.

Figure 12:
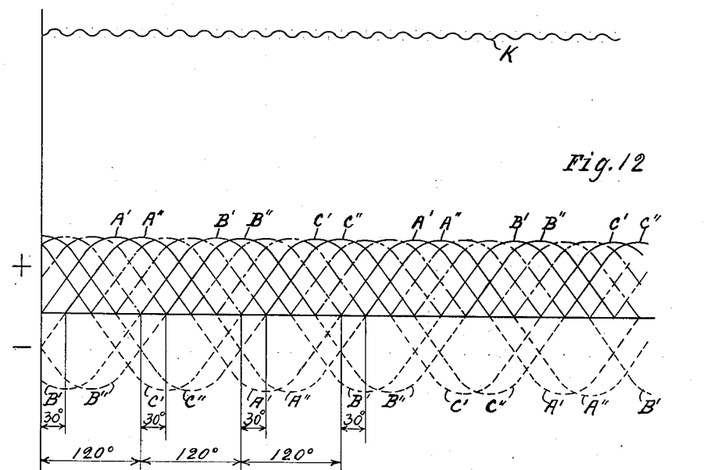
Fig. 12 is a diagram showing the form of the voltage curve obtained when the invention is operated by a six phase supply current.

Fig. 12 illustrates the curve K obtained by use of a six phase rectifier which consists of two three phase rectifiers, of phases A', B', C', and A'', B'', and C'', whose voltages of corresponding phases are displaced 30 electrical degrees as indicated on the drawings. The form of the curve K discloses that the direct current voltage is for practical purposes constant. Moreover, the ripples of the resultant voltage curve and consequently the ripples in the direct current itself are caused to disappear by the dampening effect of the squirrel cages on the stator windings which lead the direct current.

It is important to observe that to obtain different voltages from either of the devices shown in Figs. 1, 2, 3, 4, 7, and 8, a plurality of generator windings are provided with the corresponding rectifier windings, whereby each generator winding and the corresponding rectifier winding forms a direct current generator unit which may be designed to obtain any direct current voltage desired. Also, all generator windings may be arranged on the same magnetic structure, and all rectifier windings may be arranged on the same rectifier structure, thus providing a simple, compact, and economical arrangement. The direct current sides of the various units may be connected in various ways according to the results desired. For example, in Figs. 13 and 14, two methods of forming the connections are shown.

Figure 13:
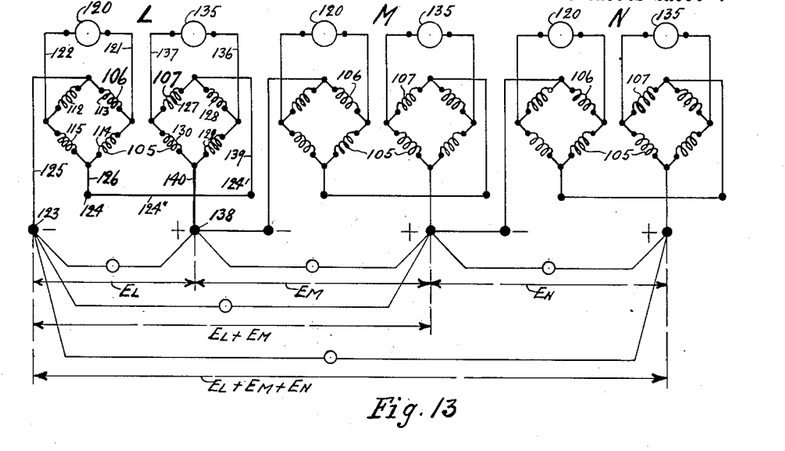
Fig. 13 is a diagrammatical view of a form of the invention of which a plurality of direct current voltages are obtained.

In Fig. 13 are shown three direct current units L, M, and N of the two phase type, each unit consisting of two single phase generators 120 and 135 with the corresponding two single phase rectifiers 106 and 107. The generators and the rectifiers are similar to those previously described and shown in Fig. 7. The units L, M, and N, respectively, are designed for voltages $E_L$, $E_M$, and $E_N$. Since the units L, M, and N are connected in series, various voltages may be obtained, because the current may be taken from any single unit simultaneously or from a combination of units connected in series. Therefore, as many units as desired may be connected in series to provide currents of different voltages for the intended purposes.

Figure 14:
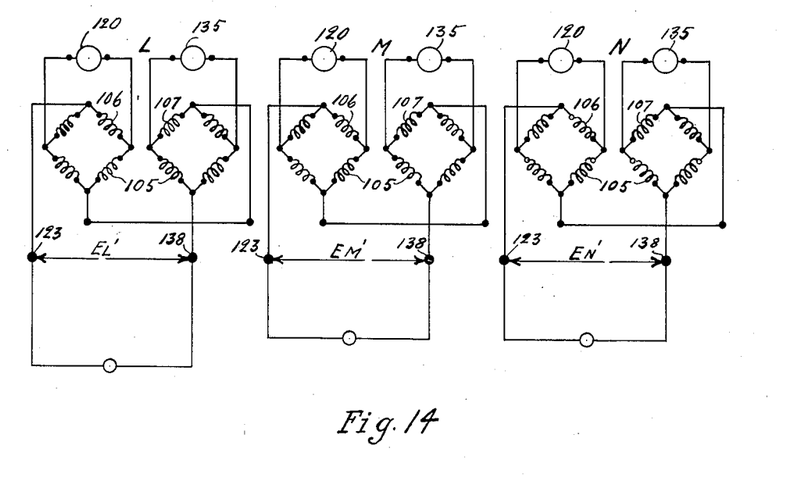
Fig. 14 is a modification of the form of the invention shown in Fig. 13.

In Fig. 14 the units L, M, and N are the same as those shown in Fig. 13, but the units are not connected with each other. Each unit comprises generators 120 and 135 forming the two phases and wound to obtain voltages $E_L'$, $E_M'$, and $E_N'$, respectively. Of course, in the form of the invention shown in Fig. 14, as well as in the form of the invention shown in Fig. 13, three or more phase rectifiers of the individual or one unit type may be used instead of the two phase rectifiers. A single structure may be utilized upon which to wind all of the generator windings and another structure may be utilized upon which to wind all of the rectifier windings thus comprising a single unit that may be enclosed in one casing.

In the form of the invention previously described and illustrated in Figs. 1, 2, 3, and 4, it is assumed that the alternating current generator and the rectifier are driven by any suitable mechanical means, as by a belt, gears or similar means. However, a more compact and self contained device may be produced by providing the alternating current generator with a separate winding and using the latter as a synchronous motor winding as by connecting it directly to the power line. By this arrangement an alternating current motor generator is provided. Or the extra motor winding may be omitted and the generator may be used as a synchronous motor as by connecting it directly to the power line.

Figure 15:
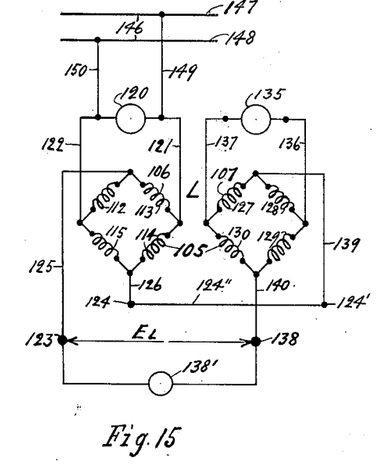
Fig. 15 is a diagrammatical view of a two phase rectifier operated from a single phase power line.

For instance, Fig. 15 illustrates how the two phase rectifier unit L, shown in Fig. 7, may be connected to and operated from a single phase alternating current line 146 comprising the usual conductors 147 and 148. The winding of the generator 120 is connected directly with the single phase power line 146 as by conductors 149 and 150, respectively, being connected with the conductors 147 and 148. All other connections of the unit are the same as previously explained for the mechanically driven unit shown in Fig. 7. The winding 120 in Fig. 15 functions now as a single phase synchronous motor, whereby the rectifier is driven and also furnishes power for the generation of the other phase of the two phase current, which is produced by the winding 135, whereas the current for the first phase (formerly supplied by the winding 120) is now supplied directly by the alternating current power line 146.

Figure 16:
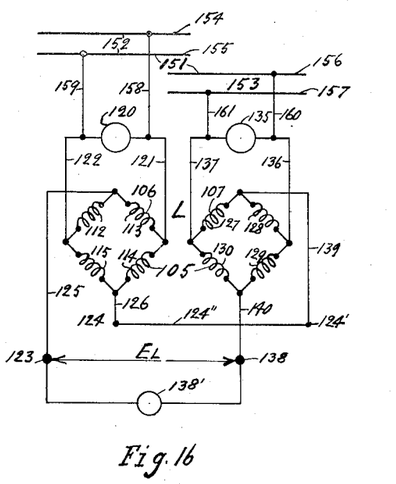
Fig. 16 is a diagrammatical view of a two phase rectifier operated from a two phase power line.

In Fig. 16 is shown how the two phase rectifier unit L is operated from a two phase alternating current power line 151, consisting of the single phase lines 152 and 153, comprising the conductors 154, 155, and 156, 157, respectively. The generator winding 120 is connected with the phase 152, as by the conductors 158 and 159 being connected with the conductors 154 and 155 respectively. The generator winding 135 is connected with the phase 153, as by the conductors 160 and 161 being connected with the conductors 156 and 157, respectively. In this form of the invention both phases 120 and 135 are connected with the source of the electric supply, or the power line, whereas in the form of the invention shown in Fig. 15 only one of the two generator phases is connected with the power line. In other words, in the form of the invention shown in Fig. 16 all of the alternating current to be converted into direct current is taken from the two phase power line, while the windings 120 and 135 of the generators, which now function as a two phase synchronous motor consume only sufficient power from the power line to operate the machine at synchronous speed, since rectification of the alternating current by the rectifier requires practically no power. Therefore, the small energy loss during the rectifying process is due only to ohmic resistance, iron losses and friction of the parts.

Figure 17:
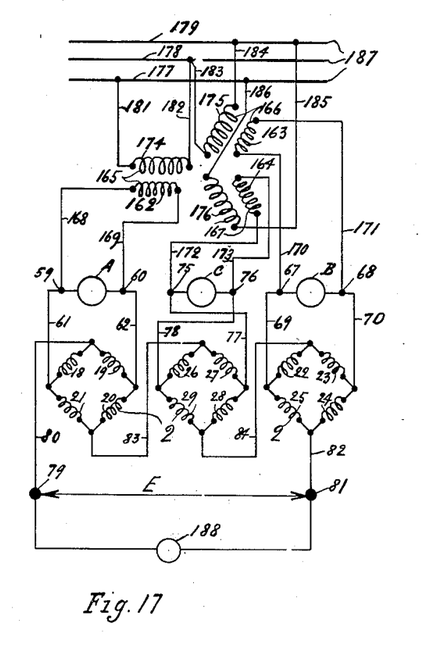
Fig. 17 is a diagrammatical view of a three phase rectifier operated from a three phase power line.

It is apparent that in the form of the invention shown in Figs. 15 and 16 the direct current voltage bears a certain ratio to the voltage of the alternating current power line, to which the rectifier is connected. If a different direct current voltage, other than that obtained, at output 138' is desired the generator may be provided with a separate motor winding, as previously described thus allowing the generator and rectifier windings to be designed for any direct current voltage desired. Or, a transformer may be interposed between the power line and the rectifier, as shown in Fig. 17, and the rectifiers may be operated from the secondaries of the transformers thus making the direct current voltage E of the load 188 independent of the alternating current power line voltage. The arrangement illustrated in Fig. 17 shows a three phase rectifier, similar to the rectifier shown in Figs. 1 to 4, and 8.

Phases A, B, and C, of the generator winding, are connected with the secondary windings 162, 163, and 164, respectively, of the three single phase transformers 165, 166, and 167, respectively, as by the conductors 168 and 169, 170 and 171, and 172 and 173, respectively. The respective primary windings 174, 175 and 176, of the transformers 165, 166 and 167, are connected with the conductors 177 and 178, 178 and 179, and 179 and 177, respectively, as by the conductors 181 and 182, 183 and 184, and 185 and 186, respectively. The conductors 177—178, 178—179 and 179—177, represents the three phases of the three phase power line 187. The direct current load 188 is connected with the D. C. terminals 78 and 81 of the rectifier.

Phases A, B, and C, of the generator winding function again as a three phase synchronous motor operating the rectifier proper, while all of the alternating current to be converted is taken directly from the secondary side of the transformer.

Since the three phases of the rectifier are connected in series, the transformers must have individual magnetic circuits and the primary and secondary phases must form individual circuits, as shown in Fig. 17, in order to insure proper operation of the whole combination. This, also, is true with reference to a two phase or any other multiphase rectifier used in a similar arrangement.

The difference between the motor driven arrangement of Figs. 16 and 17 and the mechanically driven device shown in Figs. 1 to 4, and Fig. 7, is that in the device shown in Figs. 16 and 17 all of the alternating current to be converted into direct current is supplied by the power line while in the device shown in Figs. 1 to 4 and Fig. 7, all of the alternating current to be converted into direct current is generated in the generator windings. It is understood that because the various phases of the rectifier windings are connected in series in any of these arrangements the alternating current drawn from the supply line is of a more constant character than an ordinary alternating current.

The stator coils of the various rectifiers are shown in the drawings for the sake of simplicity and are of the concentrated type. However, the stator coils may also be of the distributed type, utilizing for instance the concentric type of winding, or diamond coil winding which are usual types of windings used in induction motor windings. The winding slots 17 and 44 of the stator and rotor, respectively, may be of the open or partially closed type which are well known in the art of induction motor construction.

Furthermore, while in the drawings the rectifiers are illustrated as the two pole type, as indicated by the two open spaces between the two squirrel cages of the rotor, it is evident that the rectifiers may also be of the multipolar type. For instance, in a four pole single phase rectifier there would be eight stator coils displaced at 45 degrees circumferentially, each coil having an angular width of 22½ degrees. The eight stator coils would form the four arms of the Wheatstone bridge, whereby each arm is formed by two stator coils which may be disposed either 90 degrees or 180 degrees on the stator. In connecting the eight stator coils it must be observed that always the coils of two opposite arms of the bridge are energized while the coils of the other two opposite arms are dead, similar to the previously explained two pole rectifier. The two stator coils of one arm of the bridge may be connected in series or in parallel, as desired. The rotor of a four pole rectifier has four open spaces displaced at 90 degrees, each open space having an angular width of 22½ degrees. It is, therefore, apparent that the speed of the rotor of a four pole rectifier is half of the speed of a two pole rectifier, where alternating current of the same frequency is utilized.

It will now be apparent that I have devised a novel and useful rectifier of electric current and reverser of electrical machines and electrical apparatus which embodies the features of advantage enumerated, as desirable, in the statement of the invention and the above description, and while I have, in the present instance, shown and described the preferred embodiments thereof which will give in practice satisfactory and reliable results, it is to be understood that the same is susceptible of modification in various particulars. Moreover, I desire to emphasize that I desire patent protection against unauthorized sale, manufacture and use of all forms of this invention that are included in the spirit or scope as defined in the claims.

What I claim as new and desire to secure by Letters Patent is:

1. In an apparatus of the class described, the combination with a source of alternating current, a supply circuit connected to said source, and an output circuit, of a device comprising a plurality of reactive windings connected to said supply circuit and suitably connected to said output circuit, means associated with said reactive windings and comprising a member provided with electric current conducting material distributed over less than the entire portion of said member, said member also having a path for the magnetic field of said windings, said path being formed by a portion of said member having no conducting material distributed thereon, said conducting material being movable into and out of mutually inductive relation with said reactive windings and being disposed so that said conducting material opposes any magnetic flux which is set up by said windings and traversed by said conducting material, without interfering with the magnetic field traversing said second mentioned portion of said member, whereby the inductive reactance of said windings is changed and a reversal of the polarity of the output current with reference to the polarity of the current in said supply circuit is effected.

2. In an apparatus of the character described, the combination with a source of alternating current, of a device comprising a plurality of reactive windings forming parts of a bridge, said source being connected across one diagonal of said bridge, a consumption circuit connected across another diagonal thereof, means associated with said reactive windings and comprising a member provided with electric current conducting material distributed over a portion only of said member, said member also having a path for the magnetic field of said windings, said path being formed by a portion of said member being not occupied by said conducting material, said conducting material being movable into and out of mutually inductive relation with said reactive windings and being disposed so as to practically neutralize any magnetic flux which is set up by said windings and passes or is tending to pass through said portion occupied by said conducting material without interfering with the magnetic field traversing said second mentioned portion of said member, said means being adapted to vary the inductive reactance of said windings by changing the relative position of said means to said windings, whereby a reversal of the polarity of the consumption circuit with reference to the polarity of said source may be effected.

3. In an apparatus of the character described, the combination with an alternating current source of supply, of a device comprising a plurality of reactive windings forming parts of a bridge, said source of supply being connected across one diagonal of said bridge, a consumption circuit connected across another diagonal thereof, means associated with said reactive windings and comprising a member provided with short circuited conductors distributed over a portion only of said member, said member also having a path for the magnetic field of said windings, said path being formed by a portion of said member being not occupied by said conductors, said short circuited conductors being movable into and out of mutually inductive relation with said reactive windings and being disposed so as to substantially neutralize any magnetic flux which is set up by said windings and passes or is tending to pass through said portion occupied by said conductors without interfering with the magnetic field traversing said second mentioned portion of said member, said means being adapted to occupy one or several relative positions with reference to said windings in which positions the inductive reactance of two opposite arms of said bridge is caused to be substantially zero and said means being adapted to occupy one or several but different relative positions with reference to said windings in which second mentioned positions the inductive reactance of the remaining arms of said bridge is caused to be substantially zero, whereby a reversal of the polarity of the consumption circuit with reference to the polarity of said source of supply may be effected when said means are moved from one of said first mentioned positions into one of said second mentioned positions.

4. In a rectifying apparatus, the combination with a source of alternating current, of a device comprising a plurality of reactive windings supplied from said source, a consumption circuit connected to said reactive windings, means associated in relative motion with said windings for periodically influencing the inductive reactance of said windings, said means comprising a member provided with electric current conducting material being distributed over a portion only of said member, said member also having a path for the magnetic field of said windings formed by a portion of said member being not occupied by said conducting material, and said conducting material being adapted to be brought into and out of mutually inductive relation with said reactive windings and being disposed so that said conducting material practically neutralizes any magnetic flux which is set up by said windings and which is being traversed by said conducting material, without interfering with the magnetic field traversing said second mentioned portion of said member, whereby substantially unidirectional current may be supplied to the consumption circuit.

5. In a rectifying apparatus, the combination with a source of alternating current, of a device comprising a plurality of reactive windings supplied from said source, a consumption circuit connected to said reactive windings, means associated with said windings for periodically varying the inductive reactance of said windings and comprising a member provided with short circuited conductors distributed over a portion only of said member, said member also having a path for the magnetic field of said windings, said path being formed by a portion of said member being not occupied by said conductors, said short circuited conductors being movable into and out of mutually inductive relation with said reactive windings and being disposed so that said short circuited conductors oppose any magnetic flux which is set up by said windings and which is being traversed by said conductors without interfering with the magnetic field traversing said second mentioned portion of said member, and means for thus moving said short circuited conductors, whereby substantially unidirectional current may be supplied to the consumption circuit.

6. In a rectifying apparatus, the combination with a source of alternating current, a supply circuit connected to said source, and a consumption circuit, of a device comprising a stator and a rotor, said stator comprising a core of magnetizable material having a bore and having windings disposed thereon, said windings being connected to said supply circuit and being suitably connected to said consumption circuit, said rotor being rotatably disposed in said bore and comprising a core of magnetizable material carrying a plurality of short circuited conductors distributed over a portion only of said second mentioned core, said first mentioned core and said second mentioned core forming a path for the magnetic flux set up by said windings of said stator when energized by said source of alternating current, said path on said second mentioned core being formed by a portion not occupied by said short circuited conductors, said conductors being movable into and out of mutually inductive relation with said windings and being disposed so that said short circuited conductors practically neutralize any magnetic flux which is set up by said windings and which is being traversed by said conductors, without interfering with the magnetic field traversing said second mentioned portion of said second mentioned core, and means for moving said rotor, whereby substantially unidirectional current may be supplied to the consumption circuit.

7. In a rectifying apparatus, the combination with means for generating alternating current, a supply circuit connected to said means, and a consumption circuit, of a device comprising a plurality of reactive windings connected to said supply circuit and suitably connetced to said consumption circuit, means for periodically varying the inductive reactance of said windings and comprising a member provided with electric current conducting material distributed over a portion only of said member, said member also having a path for the magnetic field of said windings, said path being formed by a portion of said member being not occupied by said conducting material, said conducting material being movable into and out of mutually inductive relation with said reactive windings and being disposed so that said conducting material practically neutralizes any magnetic flux which is set up by said windings and which is being traversed by said conducting material without interfering with the magnetic field traversing said second mentioned portion of said member, and said member of said second mentioned means being operated by said first mentioned means, whereby substantially unidirectional current may be supplied to said consumption circuit.

8. In a rectifying apparatus, the combination with a source of multiphase alternating currents and a common consumption circuit therefor, of rectifying means for each phase of said source, said rectifying means comprising groups of reactive windings supplied from the respective phases of said source and having their output circuits connected in series with each other and connected in series with said consumption circuit, said rectifying means also comprising a member provided with electric current conducting material distributed over a portion of said member for periodically varying the inductive reactance of said windings, said member also having a path for the magnetic field of said windings formed by a portion of said member different from said first mentioned portion and having no conducting material distributed thereon, said conducting material being movable into and out of mutually inductive relation with said reactive windings and being disposed so as to substantially neutralize any magnetic flux which is set up by said windings and tends to pass through said portion occupied by said conducting material without interfering with the magnetic field traversing said second mentioned portion of said member, and means for moving said conducting material synchronously with the multiphase current supply, whereby substantially unidirectional current may be supplied to said consumption circuit.

9. In a rectifying apparatus, the combination with a source of polyphase currents and a common consumption circuit therefor, of rectifying means for each phase of said source, said rectifying means for each phase comprising a group of reactive windings forming parts of a bridge, two diametrically opposite points of said bridge being connected to the respective phase of said source, the remaining pair of diametrically opposite points of said bridge forming the output terminals of said respective phase, said output terminals of said respective phase of said source being connected in series with similar output terminals of the other phases of said source and being connected in series with said consumption circuit, said rectifying means also comprising a member provided with short circuited conductors being distributed over a portion only of said member, said member also having a path for the magnetic field of said windings formed by a portion of said member being not occupied by said conductors, and said conductors being disposed so as to substantially neutralize any magnetic flux which is set up by said windings and tends to pass through said portion occupied by said conductors without interfering with the magnetic field traversing said second mentioned portion of said member, said conductors being movable into and out of mutually inductive relation with said windings and being adapted to periodically and alternately cause the inductive reactance of said windings to be substantially zero during substantially the entire period of one alternation of said currents, and means for thus moving said conductors synchronously with the polyphase current supply, whereby the output electromotive forces of all phases of said source are caused to be mutually additive and whereby a unidirectional current of substantially uniform character may be supplied to said consumption circuit.

10. In a rectifying apparatus, the combination with a source of multiphase alternating currents and a common consumption circuit therefor, an electric motor energized from said source, of rectifying means for each phase of said source, said rectifying means comprising a stator and a rotor, said stator comprising groups of windings supplied from the respective phases of said source and having their output circuits connected in series with each other and connected in series with said consumption circuit, said rotor being provided with electric current conducting material movable into and out of mutually inductive relation with said windings of said stator, and said rotor being rotated by said motor, whereby substantially uni-directional current may be supplied to said consumption circuit.

11. In a rectifying apparatus, the combination with a source of multiphase alternating currents and a common consumption circuit therefor, an electric motor energized from said source, of rectifying means for each phase of said source, said rectifying means comprising a stator and a rotor, said stator comprising groups of windings supplied from the respective phases of said source and having their output circuits connected in series with each other and connected in series with said consumption circuit, said rotor being provided with short circuited conductors movable into and out of mutually inductive relation with said windings of said stator and being disposed so that said short circuited conductors oppose that part of the magnetic field of said windings which is being traversed by said conductors without interfering with that part of said field which is not being traversed by said conductors, and said rotor being rotated by said motor, whereby substantially unidirectional current may be supplied to the consumption circuit.

12. In a rectifying apparatus, the combination with an alternating current supply circuit, and a consumption circuit, of a device comprising relatively movable members, one of said members being provided with a plurality of reactive windings, said windings being connected to said supply circuit and being suitably connected to said consumption circuit, another of said members being provided with short circuited conductors distributed over a portion only of said second mentioned member, said second mentioned member also having a path for the magnetic field member of said windings formed by a portion of said second mentioned member being not occupied by said conductors, and said conductors being movable into and out of mutually inductive relation with said reactive windings and being disposed so that said short circuited conductors oppose any magnetic flux which is set up by said windings and which is being traversed by said conductors without interfering with the magnetic field traversing said second mentioned portion of said second mentioned member, said conductors also being adapted to periodically and alternately cause the inductive reactance of said windings to be substantially zero during substantially the entire period of one alternation of said alternating current, and means for causing a relative motion between said first mentioned member and said second mentioned member, whereby substantially unidirectional current may be supplied to the consumption circuit during substantially the entire duration of each alternation of said source.

13. In a rectifying apparatus, the combination with means for generating alternating current, a supply circuit connected to said means, and a consumption circuit, of a device comprising a plurality of reactive windings connected to said supply circuit and suitably connected to consumption circuit, means for periodically changing the inductive reactance of said windings and comprising a member provided with short circuited conductors distributed over a portion only of said member, said member also having a path for the magnetic field of said windings, said path being formed by a portion of said member being not occupied by said conductors, said conductors being movable into and out of mutually inductive relation with said reactive windings and being disposed so that said short circuited conductors practically neutralize any magnetic flux which is set up by said windings and which is being traversed by said conductors without interfering with the magnetic field traversing said second mentioned portion of said member, and said member of said second mentioned means being operated by said first mentioned means, whereby substantially uni-directional current may be supplied to said consumption circuit.

14. In a rectifying apparatus, the combination with an alternating current supply circuit, a consumption circuit and an electric motor energized from said supply circuit, of a device comprising a plurality of reactive windings connected to said supply circuit and suitably connected to said consumption circuit, means for periodically varying the inductive reactance of said windings and comprising a member provided with electric current conducting material distributed over a portion only of said member, said member also having a path for the magnetic field of said windings, said path being formed by a portion of said member being not occupied by said conducting material, said conducting material being movable into and out of inductive relation with said reactive windings and being disposed so that said conducting material practically neutralizes any magnetic flux which is set up by said windings and which is being traversed by said conducting material without interfering with the magnetic field traversing said second mentioned portion of said member, and said member of said means being operated by said motor, whereby substantially uni-directional current may be supplied to said consumption circuit.

15. In a rectifying apparatus, the combination with an alternating current supply circuit and a consumption circuit, an electric motor energized from said supply circuit, of a device comprising a stator and a rotor, said stator comprising a core of magnetizable material having a bore and having windings disposed thereon, said windings being connected to said supply circuit and being suitably connected to said consumption circuit, said rotor being rotatably disposed in said bore and comprising a core of magnetizable material provided with short circuited conductors distributed over a portion only of said second mentioned core, said first mentioned core and said second mentioned core forming a path for the magnetic flux set up by said windings of said stator when energized by said supply circuit, said path on said second mentioned core being formed by a portion not occupied by said short circuited conductors, said conductors being movable into and out of mutually inductive relation with said windings and being disposed so that said short circuited conductors practically neutralize any magnetic flux which is set up by said windings and which is being traversed by said conductors without interfering with the magnetic field traversing said second mentioned portion of said second mentioned core, and said rotor being operated by said motor, whereby substantially unidirectional current may be supplied to said consumption circuit.

16. In a rectifying apparatus, the combination with a source of alternating current, a supply circuit connected to said source, and a consumption circuit, of a device comprising relatively movable members, one of said members being provided with a plurality of reactive windings, said windings being connected to said supply circuit and being suitably connected to said consumption circuit, another of said members being provided with electric current conducting material distributed over a portion only of said second mentioned member, said second mentioned member also having a path for the magnetic field of said windings formed by a portion of said second mentioned member being not occupied by said conducting material, and said conducting material being movable into and out of mutually inductive relation with said reactive windings and being disposed so that said conducting material opposes any magnetic flux which is set up by said windings and which is being traversed by said conducting material without interfering with the magnetic field traversing said second mentioned portion of said second mentioned member, said conducting material also being adapted to periodically and alternately cause the inductive reactance of said windings to be substantially zero during substantially the entire period of one alternation of said alternating current, and means for causing a relative motion between said first mentioned member and said second mentioned member, whereby substantially unidirectional current may be supplied to the consumption circuit during substantially the entire duration of each alternation of said source.

G. HENRY POTH.